(12) United States Patent
Diederichs et al.

(10) Patent No.: US 9,944,181 B2
(45) Date of Patent: Apr. 17, 2018

(54) DISPLAY UNIT WITH OVERLAPPING THREE-DIMENSIONALLY SHAPED OLED DISPLAY FOR A VEHICLE

(71) Applicant: AUDI AG, Ingolstadt (DE)

(72) Inventors: Lutz Diederichs, Kosching (DE); Matthias Wunderlich, Ingolstadt (DE)

(73) Assignee: Audi AG, Ingolstadt (DE)

( * ) Notice: Subject to any disclaimer, the term of this patent is extended or adjusted under 35 U.S.C. 154(b) by 322 days.

(21) Appl. No.: 14/652,668

(22) PCT Filed: Nov. 15, 2013

(86) PCT No.: PCT/EP2013/003452
§ 371 (c)(1),
(2) Date: Oct. 13, 2015

(87) PCT Pub. No.: WO2014/094947
PCT Pub. Date: Jun. 26, 2014

(65) Prior Publication Data
US 2016/0059698 A1 Mar. 3, 2016

(30) Foreign Application Priority Data
Dec. 19, 2012 (DE) .................. 10 2012 024 949

(51) Int. Cl.
*B60K 35/00* (2006.01)
*B60Q 3/10* (2017.01)

(52) U.S. Cl.
CPC .............. *B60K 35/00* (2013.01); *B60Q 3/10* (2017.02); *B60K 2350/941* (2013.01)

(58) Field of Classification Search
CPC ...... B60K 35/00; B60K 2350/203–2350/2043; B60K 2350/941; B60Q 3/10; H05B 33/12; H01L 51/52; H01L 51/5237
See application file for complete search history.

(56) References Cited

U.S. PATENT DOCUMENTS 6,152,066 A * 11/2000 Knoll ................. B60K 35/00
116/286
6,409,355 B1 * 6/2002 Simon ................. B60K 35/00
362/23.08
(Continued)

FOREIGN PATENT DOCUMENTS

DE 19645674 A1 5/1998
DE 19943578 A1 3/2001
(Continued)

OTHER PUBLICATIONS

Machine Translation of Preissl DE 102005049127, retrieved from espacenet.com on Jun. 28, 2017.*
(Continued)

*Primary Examiner* — Andrew Coughlin
*Assistant Examiner* — Steven Horikoshi
(74) *Attorney, Agent, or Firm* — Alston & Bird LLP

(57) ABSTRACT

Provided herein is a display unit for a vehicle which is designed for representing information and for arrangement in an interior space of the vehicle with respect to a viewing direction of the driver of the vehicle. The display unit may include: a display device which can be connected to a device for operating the display device, in particular for operating as a function of a measured value for a state of the vehicle; an OLED display having three-dimensional geometry, in particular for a flat emission of light, where the OLED display, seen in the viewing direction, seen in particular in the forward direction, is arranged so that it overlaps with the display device and, in the overlap area, it includes a passage through which the display device can be connected to the device.

12 Claims, 5 Drawing Sheets

(56) References Cited

U.S. PATENT DOCUMENTS

| | | | |
|---|---|---|---|
| 2003/0043049 A1* | 3/2003 | Wada | B60K 37/02 340/815.4 |
| 2003/0162312 A1 | 8/2003 | Takayama et al. | |
| 2005/0030256 A1 | 2/2005 | Tubidis et al. | |
| 2005/0212669 A1* | 9/2005 | Ono | B60K 37/02 340/461 |
| 2006/0012971 A1 | 1/2006 | Fong et al. | |
| 2009/0051636 A1* | 2/2009 | Natori | G09G 3/3648 345/87 |
| 2010/0259375 A1* | 10/2010 | Ferren | B60K 35/00 340/462 |
| 2012/0126966 A1* | 5/2012 | Drury | B60K 35/00 340/438 |

FOREIGN PATENT DOCUMENTS

| | | |
|---|---|---|
| DE | 10144983 A1 | 7/2003 |
| DE | 10 2004 054 769 A1 | 5/2006 |
| DE | 10 2005 049 127 A1 | 4/2007 |
| DE | 10 2009 034 432 A1 | 1/2011 |
| DE | 10 2009 040 314 A1 | 3/2011 |
| DE | 10 2010 010 575 A1 | 9/2011 |
| DE | 10 2010 025 632 A1 | 1/2012 |
| WO | WO 2006/108617 A2 | 10/2006 |
| WO | WO 2008055606 A1 | 5/2008 |

OTHER PUBLICATIONS

International Preliminary Report on Patentability (Chapter II) from International Application No. PCT/EP2013/003452, dated May 5, 2015.

International Search Report and Written Opinion for International Application No. PCT/EP2013/003452, dated Aug. 14, 2014.

Office Action for corresponding Chinese Application No. 201380066352.0 dated Nov. 14, 2016.

* cited by examiner

DISPLAY UNIT WITH OVERLAPPING THREE-DIMENSIONALLY SHAPED OLED DISPLAY FOR A VEHICLE

The invention relates to a display unit according to the preamble of Claim 1, which is designed for representing information and for arrangement in an interior space of a vehicle.

In many vehicles, display and/or operating units are already used, by means of which a plurality of functions of the vehicle can be displayed or operated. Such display and/or operating units usually combine several display or operation types, for example, mechanical indicators, individual displays, push-button or touch-sensitive monitors, or also units for contact-free operation via voice control or for optically detected movements. They can be referred to as instrument clusters.

For some time, so-called organic light emitting diode (OLED) displays have also been used in display instruments in motor vehicles, particularly since they allow flat backlighting, are low-energy and require little installation space, and thus they can in principle already be integrated satisfactorily in existing dashboard configurations.

The published patent application DE 199 43 578 A1 features a display instrument for a motor vehicle with a light emitting polymer layer in the form of an OLED light source enclosed between two electrodes, which requires only little installation height and can be operated as a unitary light source, wherein, in the two-dimensionally designed polymer layer, a breakthrough is provided, by means of which the OLED light source can be used in connection with an analog indicator instrument for the backlighting of the indicator instrument. The OLED light source is enclosed on both sides, on a front side and on a rear side, by transparent, two-dimensionally extending electrodes as well as in each case by a cover, wherein the rear-side cover at the same time forms a housing element of the display instrument, and is connected to a printed circuit board. The OLED light source used for the two-dimensionally extending display instrument featured and the corresponding electrodes are in principle also three-dimensionally deformable, wherein, for the purpose of optimal matching to a surface contour of a dashboard of the motor vehicle, surfaces of the display instrument that present multiple curvatures can also be implemented.

The published patent application DE 10 2005 049 127 A1 features a unit for displaying information in a vehicle, which comprises a flexible display, in particular in the form of an OLED film, which forms a three-dimensionally extending body surface of a device, in particular of a central console of a vehicle, and which can actively emit light.

The published patent application DE 10 2010 010 575 A1 features a display unit for a vehicle, with a display panel, a touch-sensitive surface and a transparent layer, wherein the display unit can present any desired curvature, in particular for the purpose of arrangement on a dashboard, and the display panel can comprise an OLED display which can be provided in connection with a touch-sensitive layer.

The published patent application DE 10 2009 040 314 A1 features a display which can be bent to almost any contour, for a vehicle with a monochrome display unit, wherein the display is designed for seamless integration in curved interior surfaces and includes an OLED display which can comprise a color filter, in particular in the form of a transparent film, without requiring additional backlighting.

The published patent application DE 10 2004 054 769 A1 features a built-in instrument cluster for a motor vehicle, with an electromechanical display unit, in particular a round instrument, and with an electronic display device which is arranged uncoupled from said round instrument and in the form of an OLED display unit, and which is arranged in the viewing direction of a viewer on a dashboard, wherein a planar partially transparent mirror is provided between the display unit and the display device.

The published patent application US 2005/0030256 A1 features a foldable information display for a motor vehicle, which is arranged in a curved dashboard of the motor vehicle and can be designed as a transparent OLED display, wherein the display is arranged in a rigid frame.

One problem of the invention is to provide a display unit with a display by means of which a simple display of information can be achieved and which is constructed in a simple way. Here, the display can preferably also be integrated in a flexible way in the display unit, and advantageously it can also be used in connection with additional display instruments.

The problem is solved by a display unit having the features of Claim 1. Advantageous designs with advantageous variants of the invention are indicated in the dependent claims.

The invention is based on a display unit for a vehicle which is designed for representing information and for arrangement in an interior space of the vehicle with respect to a viewing direction of the driver of the vehicle, in particular for arrangement on a dashboard behind a steering wheel with respect to a forward direction of the vehicle, with:

a display device which can be connected to a device for operating the display device, in particular for operating as a function of a measured value for a state of the vehicle;

an OLED display having a three-dimensional geometry, in particular for a flat emission of light, wherein the OLED display, seen in the viewing direction, seen in particular in the forward direction, is arranged so that it overlaps with the display device and, in the overlap area, it comprises a passage through which the display device can be connected to the device; and a support frame which is designed for the arrangement of the OLED display.

According to the invention, it is provided that the OLED display is coupled to the support frame in a coupling area, and is shaped geometrically in a display area in such a way that it is arranged independently of the support frame, in particular uncoupled from the support frame. It is preferable that the OLED display is three-dimensionally shaped geometrically independently of the support frame. In other words, the OLED display can thus be at least partially detached geometrically, that is to say regarding its three-dimensional shape, from the support frame, that is to say it can be independent. This can be achieved in that, in one partial section, the OLED display assumes the geometry of the support frame or at least has the same dimensions or is arranged at the same site, and in another main section it is arranged independently, if desired freely in space. A mounting then occurs via the partial section or coupling area, and if desired also through the passage. Via the passage, a centering can in particular also occur.

The coupling area is here preferably a marginal area of the OLED display, that is to say an outside edge, which adapts to the inner surface of the support frame or is attached there by any means. The display area is, for example, a central area of the OLED display, which can be shaped freely with respect to an optimal optical representability or with a view to the geometric requirements of a certain dashboard. However, the display area can also be a partial section along the periphery or the outer margin of the OLED display.

Here, an at least partial geometric uncoupling from the support frame should be understood to mean that the OLED display can indeed be supported or held, on one hand, on any partial section, in particular in a marginal area, by the support frame, but, on the other hand, it can also be freely shapeable in additional partial sections, independently of the geometry of the support frame. If the support frame is designed, for example, as a circular or oval annular aperture, which delimits an inner volume in which the OLED display can be arranged, then the OLED display, for example, in its outer marginal area, either everywhere or in a partial section along the periphery of the marginal area, has at least approximately the geometry of the support frame, whereas, in an area within the volume delimited by the support frame, it has a three-dimensional geometry independently thereof, which can be defined with a view to functional requirements, design demands, the construction of the dashboard, or the position and size of display devices.

The support frame can be arranged at least partially in front of the OLED display, seen in the viewing direction. The support frame can then also be referred to as a front frame, which encloses a display area or a display space in which the OLED display is arranged. The support frame here is a kind of structural component, which can allow an incorporation of the display unit in a dashboard. The support frame can ensure the function of connecting the display unit to an instrument panel support or a support structure of the dashboard and it limits the maximum extents of the display units. The support frame here forms a mechanical or structural interface so to speak for the entire display unit by which the display unit can also be mounted. However, if desired, the support frame can also be primarily an aperture that ensures above all the haptic and optical integration of the display unit in the dashboard.

As a result of the partial uncoupling of the geometry of the OLED display from the geometry of a support frame or any cover with a similar function, integration of the OLED display can take place in a particularly flexible way. The 3D geometry of the OLED display can be selected independently of the cover or the support frame by ensuring that the OLED display is coupled only in a marginal area to the support frame. In other words, the OLED display is preferably mounted only in a marginal area of the support frame.

According to a variant, the OLED display is enclosed in the marginal area by the support frame and centered in the passage. I.e., a framing and a mechanical support can be ensured by the support frame, and an unequivocal, exact arrangement can be ensured as desired alone or in addition to the mounting on the support frame by the mounting in the passage. It is preferable to provide a sleeve in the passage, in particular a kind of socket corresponding to a tubular section for mounting an indicator vane of the display device. By this type of centering, it is possible in the design of the OLED display to ensure a defined arrangement relative to the other components of the display unit, in spite of the great flexibility and the degrees of freedom.

The three-dimensional geometry can be adjusted by a singly or multiply curved shape of the OLED display, for example, by a purely convex or concave curvature in connection with planar sections, or a curvature that is both convex and also concave in some sections. The incorporation of the OLED display according to the invention in the display unit allows a great geometric variety, and spatial hierarchies can be created, in particular by 3D effects in the representation. At the same time, the most demanding design requirements can be fulfilled, which is very important for the driver particularly in regard to a dashboard. A good design is desirable not only for aesthetic reasons, but also with a view to driving safety: a simple, well organized dashboard including, if desired, a hierarchical arrangement with respect to the respective current relevance of the information represented can have a positive effect on the behavior of the driver and contribute to an increase in safety, particularly in hazardous situations.

It is preferable that the OLED display is arranged behind the steering wheel and behind the display device, seen in the forward direction (x) which is usually the viewing direction of the driver, that is to say, for example, behind a tachometer and/or a speedometer. An arrangement behind the display device here should preferably be understood to refer to an arrangement behind an indicator of the display device. The display device can comprise, in addition to an indicator, also a dial or similar background. If desired, the OLED display can be arranged in front of or behind the dial. If it is arranged in front of the dial, then it is (semi)transparent at least in an unlit state, and it allows the information reproduced on the dial to shine through. The OLED display can be designed so that it is (semi)transparent in a state where it is supplied with current and emitting. If it is arranged behind the dial, the dial is preferably (semi)transparent.

A display unit is preferably understood to mean a unit by means of which it is possible to represent, and if desired also to operate, the functions of the vehicle or general information. The display unit can also be referred to as an instrument cluster or a (driver) information device which also fulfills an operating function.

Here, it is preferable that a display device be understood to mean a device by means of which a measured value can be displayed continuously, in particular mechanically, that is to say by means of an indicator, for example. The display device can be referred to or designed as an analog or mechanical display device. The display device can comprise one or more (mechanical) indicators, or it can already be formed by a single indicator. As examples, one can mention a clock with several hands, a fuel consumption display or a tachometer display. The device for operating the display device is then preferably an actuator which comprises a hollow shaft or the like or is connected thereto, by means of which the indicator device can be set. Nevertheless, the display device can also be an electrical display device or a display device that operates in a manner other than mechanically, wherein the device for operating the display device is then preferably a kind of computation unit which can be connected, for example, via an electrical line to the display device through the passage.

The curved OLED display has the advantage of a reduced need for installation space, because the design of the OLED display can be very thin, in particular thinner than TFT displays (thin film transistor displays). In addition, the heat management, i.e., the removal of dissipated power or in general the cooling of the OLED display can be ensured in a simple manner, in particular since the OLED display has less power loss and thus causes less heat development than other displays. Furthermore, an OLED display is particularly advantageous in terms of energy, so that, for example, backlighting of displays is also possible during daytime without detectable load on the on-board electrical system.

In addition, by means of the curved OLED display, the incorporation of a lighting device in the display unit can be optically improved, since the OLED display can be given a geometry that is optimized with a view to design requirements. On the OLED display, one can thus represent, for example, information on the tank content, inside or outside temperature, vehicle speed, engine rpm, warning messages or other information on the driving situation, driving safety or infotainment.

The coupling can be established here by any connection, of mechanical and/or electrical type. By means of the passage it is possible to ensure that the integration of the OLED display in the display unit can be implemented over a large area of the display unit, and a uniform backlighting becomes possible.

The passage can be a breakthrough of any shape, for example, circular, or elliptic, or having an at least approximately polygonal geometry. Through the passage, an indicator or else a button or a support frame element can be inserted. The OLED display itself can be controlled as a function of the geometry of the passage. For this purpose, it has a control matrix which has a structure that is led around the passage. The control matrix is formed by rows and columns that are basically parallel to one another; however, in the area of the passage they are led around the passage and frame the latter. The rows and columns are not interrupted but extend continuously. The row and column control can also be implemented simply in the case of a passage without having to produce additional interfaces relative to individual lines or rows. The control matrix here preferably has a segmentation which allows not only flat (back)lighting, but also a representation of individual symbols, characters or image points.

Furthermore, it is preferable that the support frame is designed for the defined arrangement of the OLED display relative to the display device. Here, the support frame can have an inside contour which corresponds to the outside contour of the OLED display at least in some sections in a marginal area of the OLED display, so that the OLED display can be centered in the support frame and/or attached with positive connection. The OLED display can preferably be connected from the rear (opposite the viewing direction) to the support frame, in particular engaged in the support frame.

The structure of the control matrix can be provided during the manufacture of the OLED display, and in particular it can be introduced in a polymer layer of the OLED display. The usual construction of an OLED display without passage does not have to be changed here, rather it is sufficient to match the structure of the control matrix with anode and cathode to the contour of the passage.

For the production of the passage or breakthrough, it is possible to use common production methods, depending on the material used. As a material, one can consider using, for example, glass, plastic and polymer layers, in particular polymer films. Here, glass can be processed by water jet cutting, laser cutting or targeted rupturing, wherein a post-processing of edges can be appropriate, for example, by polishing. Films can be given the desired geometry by punching and/or laser cutting, for example.

It is preferable that the support frame for the arrangement of the OLED display is designed relative to the display device. In other words, the OLED display can be oriented by means of the support frame and positioned or mounted stationarily relative to the display device.

According to a preferable embodiment example, the OLED display has a concave curvature in the viewing direction, which is arranged to the side of the overlapping area seen in the viewing direction, wherein the OLED display in the overlapping area is coupled, in particular connected, to the support frame. Here, a connection is preferably established directly, that is to say without the intercalation of an additional element. As a result, the OLED display in the overlapping area can be coupled directly and simply to the support frame. The support frame here can include simultaneously a dial and the OLED display. The coupling area can here correspond to and/or be arranged immediately adjacent to a partial area of the overlapping area.

It is preferable that the display device comprises an indicator which is arranged in front of the OLED display with respect to the viewing direction and which can be connected to the device. In this case, the device is preferably a mechanical actuator. As a result, an integration and coupling of the lighting function with the display function of the indicator can occur. The OLED display can display additional information depending on the position of the indicator, for the purpose of reinforcing or weighting the information conveyed by the indicator.

According to an advantageous embodiment, the OLED display in the overlapping area is arranged so that it is in contact with an inner margin and/or an inner lateral surface of the support frame. As a result, a simple connection can be established. The outer contour of the OLED display in the coupling area here corresponds preferably to any inner contour on the support frame, so that it is possible to also ensure as desired a positive connection, for example, engagement. In the overlapping area, the geometry of the OLED display is thereby coupled to the geometry of the support frame. With the exception of this overlapping area, the geometry of the OLED display can be uncoupled. The inner margin can produce a front or side attachment of the OLED display, depending on whether the OLED display is arranged in front of or behind a dial of the display unit.

It is preferable that the OLED display in the overlapping area has a planar design and is arranged flat in a plane behind an indicator of the display unit relative to the viewing direction. As a result, a display unit can be produced which requires particularly little installation space. By a combination of curved sections and sections of planar design, it is possible to achieve, using a single OLED display, on one hand, a spatial effect and also already a hierarchical representation of information, and, on the other hand, information can be represented in the immediate vicinity of the display device, for example, a warning symbol located immediately adjacent to the speed 60 km/h of the display device, in order to clearly show that the allowed speed of 60 km/h has been exceeded. Several differently shaped, two-dimensional and three-dimensional areas of the OLED display can contribute to a particularly functional combination of analog and lighting-technology representation forms. At the same time, the dashboard is given a self-enclosed overall impression, and it is possible to define an area that can be identified immediately even by a driver who is not familiar the vehicle and which displays important information on the driving situation. This facilitates, for example, the operation by the driver of initially unfamiliar rental vehicles from a vehicle fleet of a rental car provider (car sharing).

It is preferable that the OLED display comprises, immediately adjacent to the overlapping area, that is to say next to the planar section, a section with convex curvature opposite the viewing direction. Moreover, it is preferable that the curved section with convex curvature opposite the viewing direction is formed so that it has a contour that matches the contour or the marginal course of a dial of the display device, so that the dial in the mounted state of the OLED display is framed by the section with convex curvature opposite the viewing direction. As a result it is possible to achieve, in a simple way, an optical, and hence for the viewer implicitly also functional, separation of the area of the display device from a representation area formed purely digitally or by lighting. This facilitates a hierarchical representation of information and the locating of certain information that the viewer is seeking on the dashboard.

According to an advantageous embodiment example, the OLED display is arranged completely behind the display device relative to the viewing direction completely and forms a backlighting of the display device. As a result, using an OLED display that can be implemented simply, it is also possible convey information that is differentiated by color or in terms of contrast without having to provide additional light sources. By making use of different control possibilities of the OLED display, a plurality of functions can be represented by the OLED display and the understanding is simplified for the driver, for example, in the case of a breakdown.

According to an advantageous embodiment example, the display device comprises a dial, and the OLED display is arranged in front of the dial relative to the viewing direction. As a result, a representation of additional information can occur independently of the material or the translucence of the dial, and the OLED display can be provided in a particularly flexible manner in connection with a display device, without having to adapt the display device for this purpose. This is of interest, for example, for vehicle series for which model variants exist that can be equipped with an additional electric drive if desired. Then it is possible, for example, to provide the OLED display only for the hybrid vehicles with the additional drive, for example, in order to be able to display additional functions of a vehicle battery, in particular the consumption of electrical energy, or the expected range in connection with a vehicle speed currently displayed by the display device.

According to an advantageous embodiment example, the OLED display is arranged so that it overlaps with an additional display device and has an additional passage. Here, it can be formed with a one-dimensional or two-dimensional concave curvature seen in the forward direction (x), between the display devices. Here, an advantageous, large-surface integration of the OLED display in commonly encountered dashboard configurations can be achieved. A dashboard can be provided which itself has a uniform design and which can be backlit uniformly. This offers the advantage that the backlighting intensity can also be adapted to the light intensity of the environment, during the day or at night, and it is possible to dispense with blinding pin-point light sources, or the latter can be reserved for important warning messages.

Here, a one-dimensional concave curvature should be understood to mean a curvature that can be described only by a curved course in an x-z plane. A two-dimensional concave curvature here should be understood to mean a curvature that is described by a curved course in an x-z plane and in an x-y plane, wherein the forward direction corresponds to the x direction.

According to an advantageous embodiment example, the OLED display is formed so that, in an area adjacent to the overlapping area, it has a convex curvature seen in a forward direction. As a result, the OLED display can be given a good intrinsic stability, on one hand, and, on the other hand, a contour of the entire display can be made to stand out due to the OLED display, in order to improve the spatial appearance and better separate the information represented. By means of a convex area that encloses the display device like a frame, a hierarchical delimitation of the information represented can also occur, and the OLED display can assume a geometry or contour of the display unit and in this manner create a self-enclosed area for the representation of the information.

According to an advantageous embodiment example, the display unit furthermore has a touch-sensitive operating section, and it is designed as a display and operating unit. By the combination of a touch-sensitive operating section with the OLED display or its integration in the OLED display, a multifunctional display unit can be formed, which allows the implementation of a plurality of display and operating functions within the narrowest space. The touch-sensitive operating section is preferably provided in the curved area of the OLED display or, if the OLED display has a planar area which is not arranged behind a display device, it is (also) provided in this planar area if desired.

It is preferable that the touch-sensitive operating section is coupled to the OLED display in such a manner that an occupant of the vehicle can select information represented on the OLED display or he/she can carry out the operation of standard functions which can be controlled, for example, via stationary or moveably arranged symbols. In particular, the touch-sensitive operating section can be designed as a touch screen which is backlit by the OLED display.

According to an advantageous embodiment example, the OLED display comprises a control matrix, which a structure that is led around the passage. As a result, independently of a specific geometry of the passage, a control of the OLED display can take place in a simple way, and a new configuration of the control is not required. This offers the advantage, in the case of passage geometries that differ from one another, that the OLED display can nevertheless still be operated in at least approximately the same manner.

Preferably the structure is provided in a polymer layer of the OLED display and is formed by continuous uninterrupted rows and columns, which frame the respective passage.

According to an advantageous embodiment example, the display unit comprises a control device for operating the OLED display. As a result, a functional component group can be provided, which can be installed in a plurality of different vehicles and coupled to a vehicle system. The control device is designed here so as to control the control matrix of the OLED device as a function of the structure led around the passage.

According to an advantageous embodiment, the display unit is arranged in a vehicle behind a steering wheel of the vehicle seen in the forward direction and coupled to a device for operating the display device. The arrangement of an OLED display with three-dimensional geometry in this area of the vehicle offers the advantage of a hierarchically structured information representation as well as of an adaptable illumination of the most important dashboard area, in particular as a function of the vehicle situation and/or environmental conditions such as the intensity of the daylight, for example.

The features and feature combinations mentioned in the description as well as the features and feature combinations mentioned in the description of the figures or only shown in the figures can be used not only in the respectively indicated combination, but also in other combinations or separately without leaving the scope of the invention.

Additional advantages, features and details of the invention can be obtained from the claims, the following description of preferred embodiments as well as in reference to the drawings, wherein identical or functionally equivalent elements are provided with identical reference numerals.

Figure 1A:
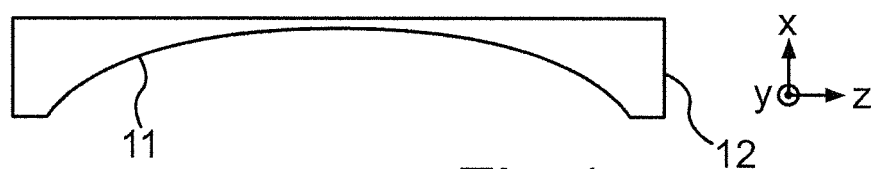
FIG. 1a shows a display device with an OLED display in a diagrammatically represented cross-sectional view.

In FIG. 1a, a display device with an OLED display 11 with a concave curvature is shown, that is to say with an inward curvature in the x direction. As a result, a depth effect is given to a user viewing in the x direction, and a self-enclosed impression is created. In addition, the OLED display 11 can be protected satisfactorily against stray radiation.

Figure 1B:
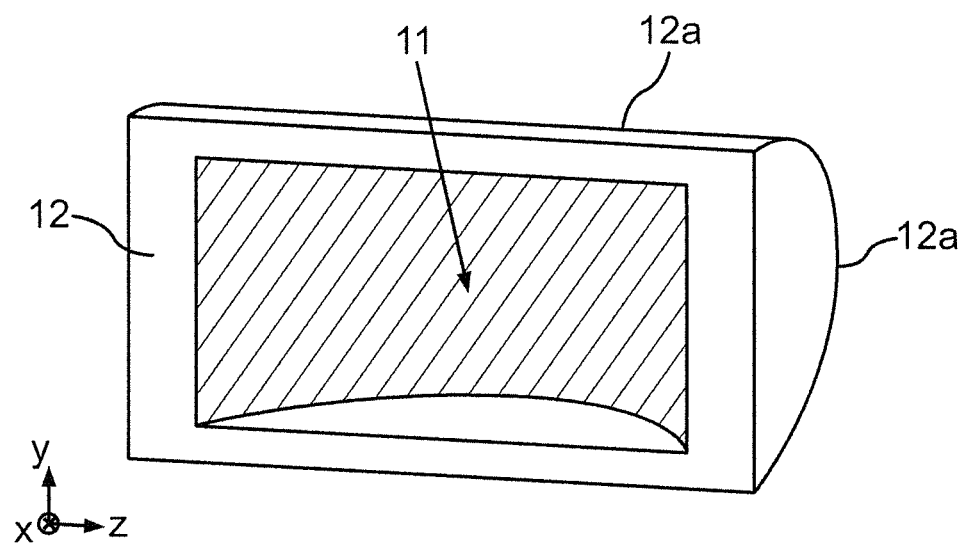
FIG. 1b shows the display device of FIG. 1a in a diagrammatically represented front view.

In FIG. 1b, the display device is shown in a viewing direction in the x direction. The support frame 12 has a frame contour 12a by means of which the curvature of the OLED display 11 can be predetermined. The curvature can be designed, on one hand, to be concave relative to an x direction, and, on the other hand, it can also be designed to be concave relative to a z direction, that is to say it can form an elliptic negative shape for the OLED display 11.

Figure 2A:
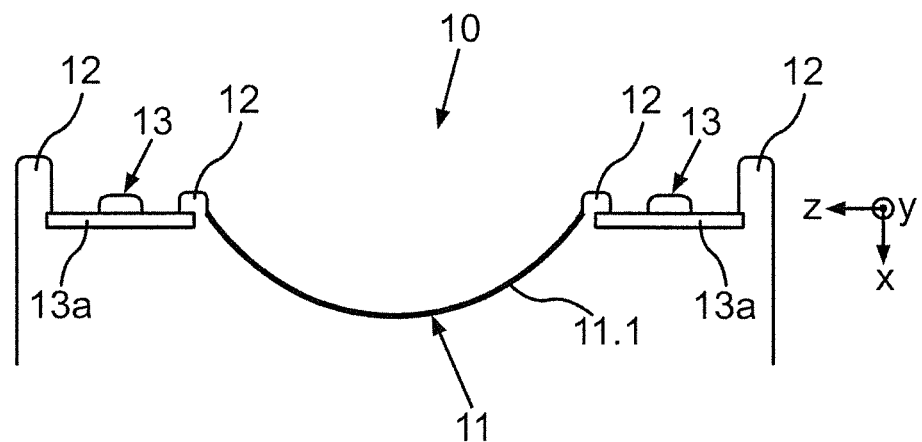
FIG. 2a shows a display unit with an OLED display according to a first embodiment example of the invention, in particular an instrument cluster with central display and analog displays, in a diagrammatically represented cross-sectional view.

In FIG. 2a, the display unit 10 with an OLED display 11 provided in a partial area is. The OLED display 11 is provided here between two display devices 13, without being coupled to the display devices 13 with a view to the representation of information. The display devices 13 each have a dial 13a. Between the display devices 13 and the OLED display 11, a support frame 12 is arranged, which, in particular at this interface, can also fulfill the function of an aperture. The OLED display 11 comprises a curvature 11.1 which is concave in the x direction corresponding to a forward direction, that is to say it has a rearward or inward curvature.

Figure 2B:
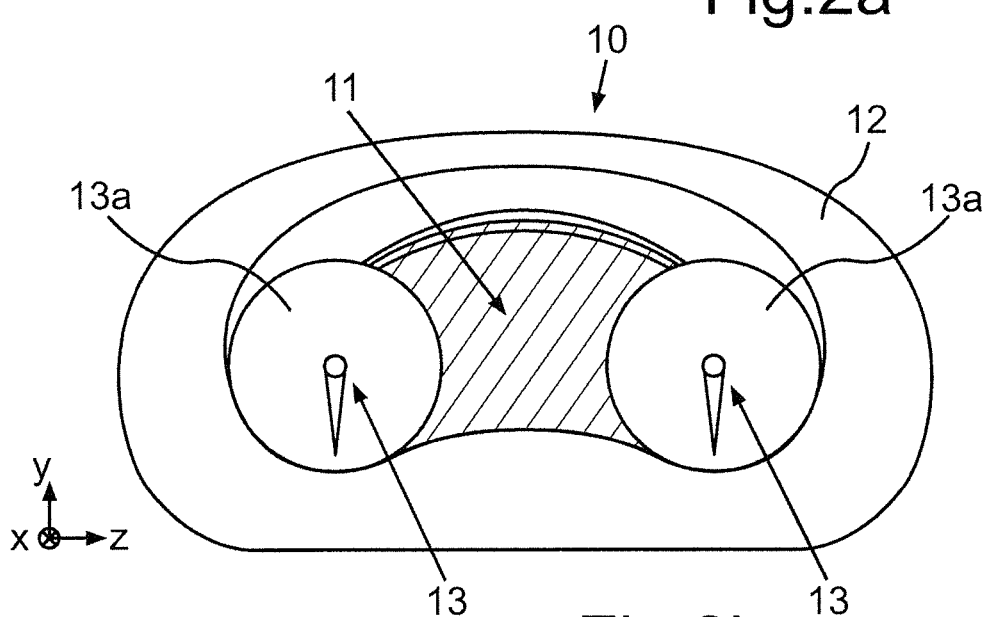
FIG. 2b shows the display unit of FIG. 2a in a diagrammatically represented front view.

In FIG. 2b, in a front view, the support frame 12 is represented, which encloses two display devices 13, and the OLED display 11 is arranged between the display devices 13. The OLED display 11 here fills the area between the two display devices 13, in particular between the dials 13a, and it follows, on a top side and on a bottom side, a contour of the support frame 12. The interface between the display devices 13 and the OLED display 11 is geometrically matched to the display devices 13, that is to say the OLED display 11 is immediately adjacent to the display devices 13.

This results in the advantage that no space between the display devices 13 remains unused, since the OLED display 11 can be lit two-dimensionally and information is represented everywhere on it, that is to say in the entire area between the display devices 13.

Figure 3A:
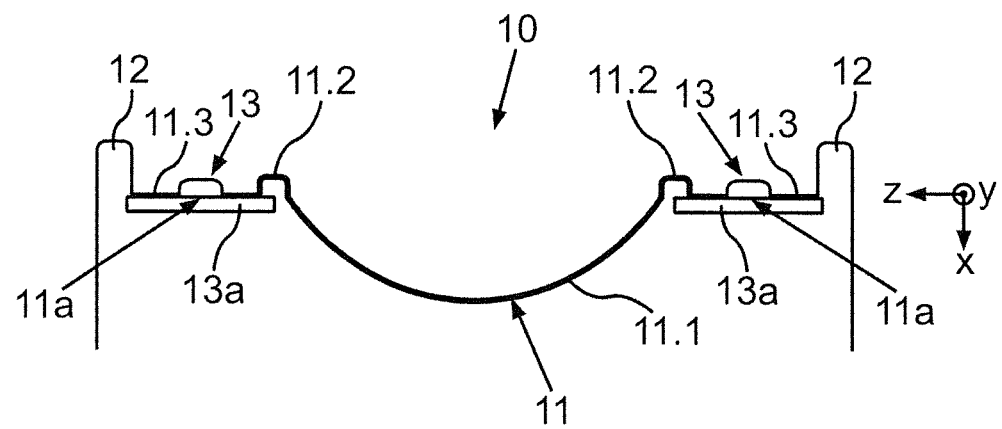
FIG. 3a shows a display unit with an OLED display according to a second embodiment example of the invention in a diagrammatically represented cross-sectional view.

In FIG. 3a, an embodiment example is shown in which the OLED display 11 occupies the entire area between the two outer limbs of the support frame 12, that is to say the OLED display 11 is also present in the area of dials 13a of the display devices 13, that is to say in the overlapping area, which is made possible in particular since it has passages, recesses or holes 11a, through which indicators of the display devices 13 can be led or at least controlled. In other words, in the passages 11a, a coupling, for example, a shaft, is provided between the indicators and a respective actuator. In this manner, a lighting of the display devices 13 can also occur, without having to provide special separate light sources for this purpose. The display unit 10 can be lit over its entire surface by means of the OLED display 11. In the variant shown, the OLED display 11 is of planar design in the area of the dials 13a, and arranged in front of the dials 13a seen in the x direction.

The OLED display 11 has a concave curvature in an x or z direction in at least some areas; in addition, it can also have a curvature relative to the y direction. The OLED display 11 also has a convex curvature in the x direction, in particular in an area adjacent to the display devices 13, in which it transitions from a planar geometry behind the display devices 13 into a concave geometry between the display devices 13. As a result, an optical separation of the individual sections of the OLED display 11 can occur, and an intrinsic stability or a stiffness can be conferred to the OLED display 11, so that it does not react excessively elastically to being touched by objects or persons, and instead it provides resistance to being touched, even without special structural components. This is advantageous in connection with a touch-sensitive layer to which the OLED display 11 can be coupled. Overall, the OLED display 11 comprises three differently shaped sections, namely a concave curvature 11.1 in an area between the display devices 13, then a convex curvature 11.2 in at least one area adjacent to one of the display devices 13, and a planar section 11.3 behind at least one of the display devices 13 or behind at least one indicator and/or indicator tip of the display devices 13.

Figure 3B:
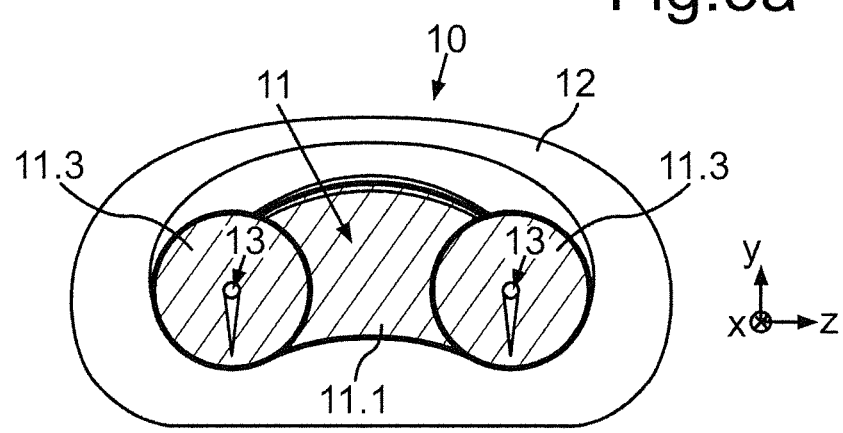
FIG. 3b shows the display unit according to FIG. 3a with display devices in a diagrammatically represented front view.

In FIG. 3b, the OLED display 11 is arranged in the forward direction x behind the indicators of the display devices 13. Here, dials 13a or similar information carriers of the display devices 13 are suggested behind the indicators, and the OLED display 11 is arranged in front of these dials. The OLED display 11 can be arranged as desired in front of or behind the respective dial 13a, and also in one case in front of and in the other case behind the dial 13a. In FIG. 3b, the OLED display 11 is shown as a coherent integral display 11. It follows the contour of the support frame 12 and forms a single flat device that can be lit for representing information, and if desired also for operation.

Figure 3C:
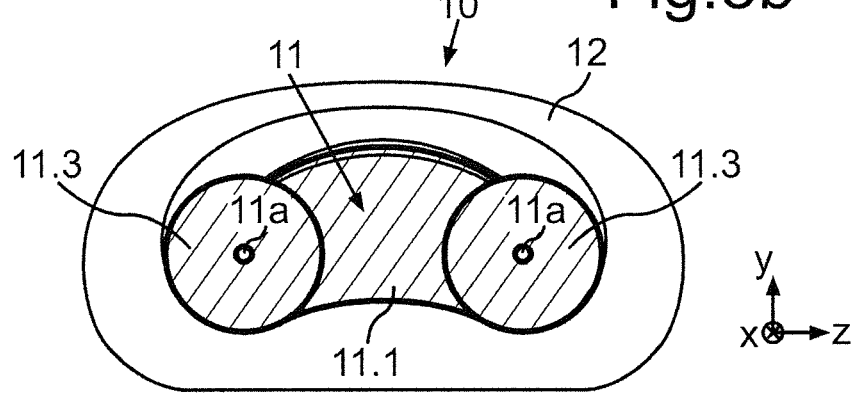
FIG. 3c shows the display unit according to FIGS. 3a, 3b in a diagrammatically represented front view, wherein the display device is not represented.

In FIG. 3c, indicators of the display devices 13 are not represented, in order to emphasize where recesses or holes 11a can be provided in the OLEd display 11. Depending on the design of the indicator, the OLED display 11 can be attached at least partially by means of the indicator itself in the vehicle dashboard, that is to say the indicators can prevent shifting of the OLED display 11 to the side or in a depth direction. According to a variant, the OLED display 11 is guided with its hole 11a by a sleeve (not shown) in which an indicator device of the display device 13 is mounted.

Figure 4A:
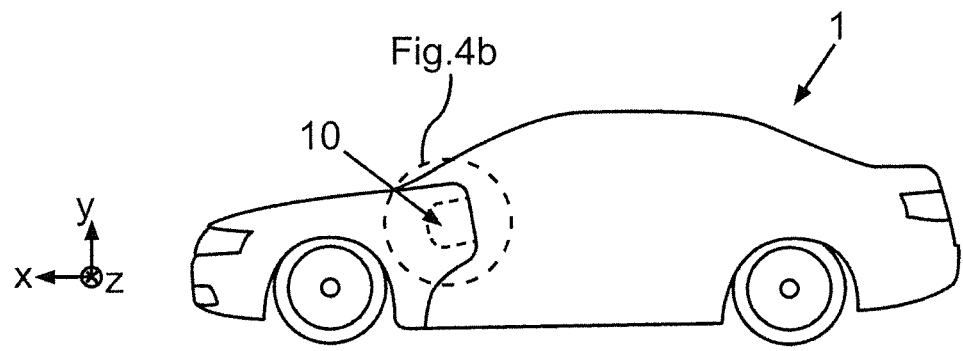
FIG. 4a shows a vehicle with a display unit according to one of the embodiment examples of the invention in a diagrammatically represented side view.

In FIG. 4a, a vehicle 1 is shown, in which, in the area of a steering wheel, an instrument unit or an interface component 10 which comprises an OLED display is provided. The OLED display can be curved with convex and/or concave curvature and thus the interface component 10 can be simply integrated as a function of a certain geometry of an instrument carrier in the vehicle 1 and in the process it can also be coupled to an additional display device.

Figure 4B:
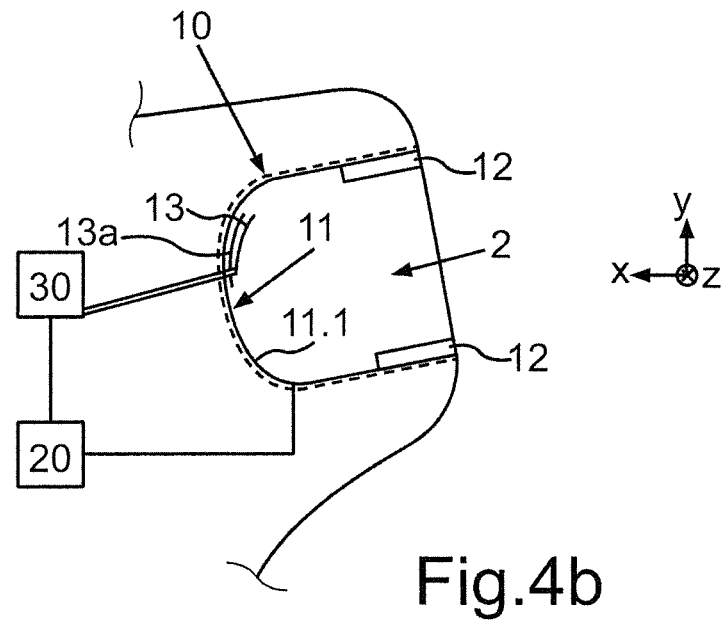
FIG. 4b shows the display unit according to FIG. 4a in a diagrammatically represented detailed side view.

In FIG. 4b it is shown in detail how an OLED display 11 of an instrument unit 10 or of an interface component 10 can be coupled to an instrument panel carrier or a vehicle dashboard. The interface component 10 is provided in a recess 2 of a dashboard of the vehicle, and it comprises a support frame 12 by means of which it can coupled to the vehicle dashboard. The OLED display 11 is arranged in the recess 2 in accordance with the geometry of the vehicle dashboard or of the instrument panel carrier, that is to say it follows the contour of the recess 2 and it is curved accordingly, with convex and/or concave curvature. A display device 13 is led at least partially through the OLED display 11 and in connection with a setting device 30 or an actuator. The OLED display 11 itself is connection with a control device 20 which is designed so as to operate the OLED display 11, in particular to light it, and which is also coupled to the setting device 30 or the motor 30.

In the depicted embodiment example, the OLED display 11 is arranged in the x direction behind a dial 13a of the display device 13. The area of the OLED display 11 that overlaps with the display device 13 is formed as a concave curvature 11.1. In other words, the OLED display 11 in the area of the display device 13 does not have a planar design but has a three-dimensional curvature instead. As a result, lighting or backlighting can be provided in a particularly flexible manner.

Figure 5A:
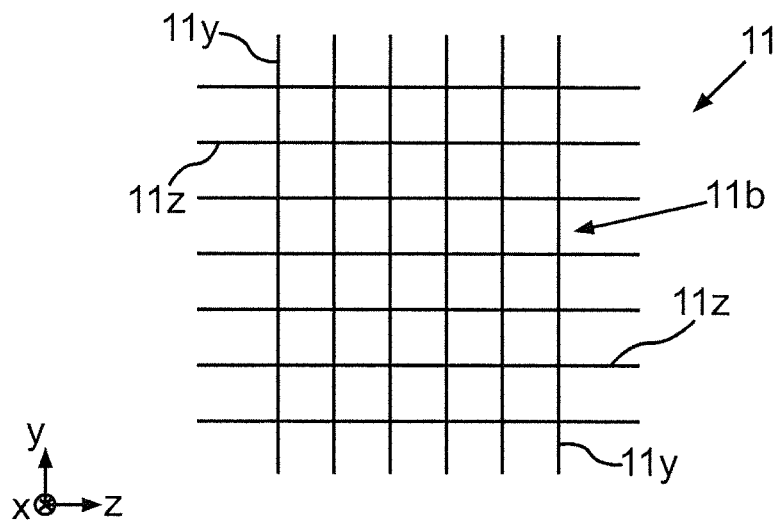
FIG. 5a shows the structure of a conventional OLED display without passage in a diagrammatically represented top view.

In FIG. 5a, a control matrix 11b of an OLED display 11 without passage is represented. The control matrix 11b has rows 11z and columns 11y, which extend at a defined distance apart and at least approximately parallel to one another.

Figure 5B:
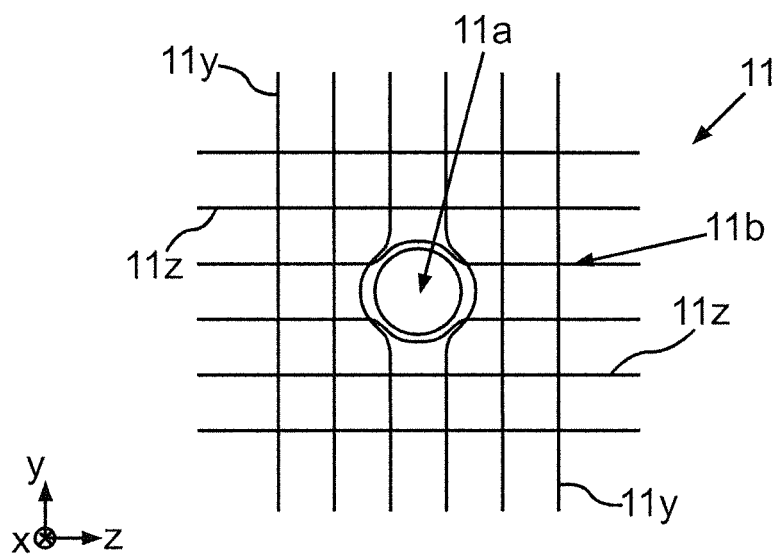
FIG. 5b shows the structure of an OLED display comprising a passage for a display unit according to the invention in a diagrammatically represented top view.

In FIG. 5b, a control matrix 11b of an OLED display 11 with circular passage 11a is shown. The control matrix 11b comprises rows 11z and columns 11y, which extend at a defined distance apart and at least approximately parallel to one another, but which are led around the passage 11a in the area of the passage 11a. In the present case, in each case two rows 11z and columns 11y are not strictly parallel but deviate from their proper course and frame the passage 11a. The passage 11a is here enclosed by two rows 11z and two columns 11y, and the OLED display 11 can also be controlled in a marginal area of the passage 11a.

The invention claimed is:

1. A display unit for a vehicle, which is designed for representing information and for arrangement in an interior space of the vehicle with respect to a viewing direction of a driver of the vehicle, with:
   a display device which can be connected to a device for operating the display device;
   an OLED display having a three-dimensional geometry for emitting light, wherein the OLED display, seen in the viewing direction, is arranged so that it overlaps with the display device and, in the overlapping area, it comprises a passage through which the display device can be connected to the device for operating the display device;
   a support frame which is designed for the arrangement of the OLED display;
   wherein in a coupling area, the OLED display is coupled to the support frame and, in a display area, it is geometrically shaped so that, regarding the three-dimensional shape of the OLED display, it is arranged at least partially detached from the support frame, in that the OLED display in a partial section assumes the geometry of the support frame and in another main section it is arranged freely in space forming a three-dimensional curvature in which the OLED display does not conform with the geometry of the support frame.

2. The Display unit according to claim 1, characterized in that, in the viewing direction, the OLED display has a concave curvature which is arranged in the viewing direction to the side of the overlapping area, wherein the OLED display is coupled in the overlapping area to the support frame.

3. The display unit according to claim 1, characterized in that, in the overlapping area, the OLED display is arranged so that it is in contact with the inner margin of the support frame.

4. The display unit according to claim 1, characterized in that, with respect to the viewing direction, the OLED display is arranged completely behind the display device and forms a backlighting of the display device.

5. The display unit according to claim 1, characterized in that the display device comprises a dial, and the OLED display is arranged in front of the dial with respect to the viewing direction.

6. The display unit according to claim 1, characterized in that the OLED display is arranged so that it overlaps with an additional display device and comprises an additional passage.

7. The display unit according to claim 1, characterized in that the OLED display in an area adjoining the overlapping area is designed with a convex curvature seen in a forward direction.

8. The display unit according to claim 1, characterized in that the display unit moreover comprises a touch-sensitive operating section and is designed as a display and operating unit, wherein the touch-sensitive operating section is within at least a portion of the main section arranged freely in space forming a three-dimensional curvature that does not conform with the geometry of the support frame.

9. The display unit according to claim 1, characterized in that the OLED display comprises a control matrix which has a structure that is led around the passage.

10. The display unit according to claim 1, characterized in that the display unit comprises a control device for operating the OLED display.

11. A Vehicle with a display unit according to claim 1.

12. The Vehicle according to claim 11, characterized in that the display unit is arranged behind a steering wheel of the vehicle seen in the forward direction and coupled to a device for operating the display device.

* * * * *